Aug. 14, 1923.
R. RAGSDALE
1,465,023
SHOCK ABSORBER
Filed Oct. 10, 1921
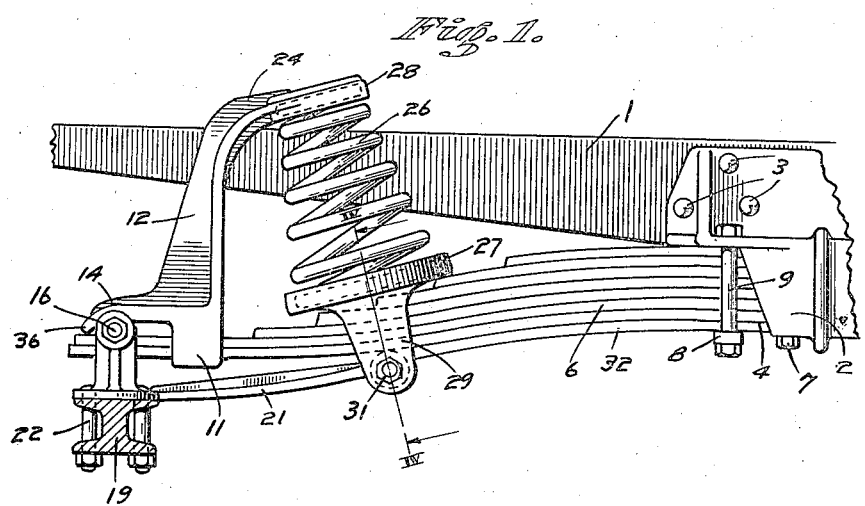
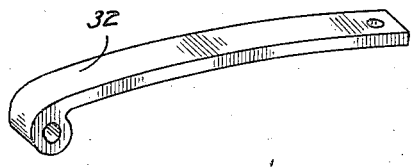
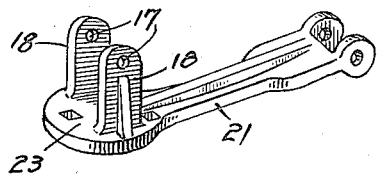
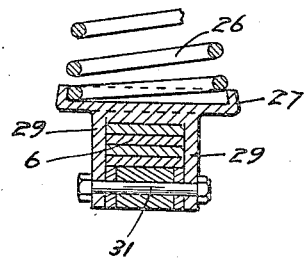
Inventor
RAYMOND RAGSDALE
By *[signature]*
Attorneys.

Patented Aug. 14, 1923.

1,465,023

UNITED STATES PATENT OFFICE.

RAYMOND RAGSDALE, OF PORTERVILLE, CALIFORNIA.

SHOCK ABSORBER.

Application filed October 10, 1921. Serial No. 506,770.

*To all whom it may concern:*

Be it known that I, RAYMOND RAGSDALE, a citizen of the United States, and resident of Porterville, county of Tulare, and State of California, have invented a new and useful Shock Absorber, of which the following is a specification.

The present invention relates to improvements in shock absorbers for motor vehicles and is adapted to be used principally in connection with so-called cantilever springs, two of which ordinarily co-operate in supporting the body in such a manner that they are oppositely arranged, their base ends resting on a support while their other ends extend arc like toward each other and support the body of the motor vehicle. The two base ends of the springs are usually supported on the front and rear axles respectively and any jolt or shock transmitted to either of said axles from the wheels is ordinarily transmitted directly to the body of the vehicle through the springs.

It is the object of my invention to interpose a shock absorbing means between the axle and the body of the vehicle which will cause any shock transmitted to the spring from either of the axles to actuate the spring from opposite directions and to thus spend its force in a number of minor vibrations without substantially affecting the body itself.

In the accompanying drawing my shock absorber is shown in connection with the front axle of a motor vehicle, it being understood that it may be connected in the same manner with the rear axle and that slight variations might be made in the arrangement of the details without affecting or departing from the spirit of the invention. In the drawing, Figure 1 represents a side elevation of my shock absorber attached to an automobile spring, the front axle being shown in section; Figure 2 a perspective detail view of a bracing or driving member used in connection with my shock absorber; Figure 3 a perspective detail view of a second bracing or driving member co-operating with the one shown in Figure 2, and Figure 4 a cross section along line 4—4 of Figure 1.

The vehicle body supporting frame (1) is shown broken away in Figure 1 and is provided with a downwardly extending sleeve (2) secured to the same by the rivets (3). The upper end (4) of the spring (6) is adapted to be fitted into the sleeve and to be firmly secured to the same by means of the bolt (7). It is further secured by means of a metal plate (8) held in spaced relation to the frame member (1) by means of bolts (9). Ordinarily the front end of the spring is directly secured to the axle but in my arrangement the front end is lifted and supported in a perforated lug (11) forming an integral part of a bracket (12). The latter is supported in two different places at opposite ends so that it may be, broadly speaking, considered a lever or fulcrum an intermediate portion of which supports the front end of the spring while the two ends are supported in the following manner:

The front end (14) is pivotally supported over the front axle on a pin (16) carried in registering perforations (17) in two parallel lugs (18) rising from the axle (19) in spaced relation. In this connection I want to call particular attention to the fact that the pin (16) rests directly over the axle (19). No importance is attached to the particular method of supporting the pin and it does not make any difference whether the two lugs (18) form an integral part of the member (21) shown in Figure 2 or whether they are separated from said member as long as they are supported directly on the axle preferably by means of the bolts (22) penetrating the flanges of the H-shaped axle and the horizontal plate (23) carrying the lugs. The rear end (24) of the lever or bracket (12) is elastically supported over the spring (6) preferably somewhat closer to the front axle than to the rear end of the spring. The elastic supporting means is shown in the drawing as comprising a spiral spring (26) of conical outline resting on the base (27) and received in a recess of the extension (28) of the lever arm (24). The base (27) is secured to the spring (6) by means of two tongues (29) extending downwardly from the base (27) in spaced relation to each other and fitting on the two sides of the spring. They are connected underneath the spring by the bolt (31) which serves at the same time as a connecting means for the two driving members (21) and (32) shown in detail in Figures 2 and 3. The driving member (21) extends forwardly and is rigidly secured to the front axle either as an integral part of the plate (23) supporting the two lugs (18) or independent of the same. The driving member (32) which is shown in Figure 3 as a rigid plate extends rearwardly from the pin (31) and runs underneath the spring (6) into the sleeve (2) to be secured there by the bolt 7.

It will thus be seen that the two members (21) and (32) constitute a direct driving connection between the body of the vehicle and the front axle, while the spring (6) serves principally as a shock absorbing means, its qualification for this purpose being increased by the addition of my specific shock absorber described in the present application. It will be noticed that any shock transmitted from the wheel to the front axle and from the front axle to the pin (16) will tend to simultaneously lift the main spring (6) by means of the supporting lug (11) and to press down on an intermediate portion of the same through the spiral spring (26) thus practically absorbing the shock before the same reaches the body.

An additional feature for increasing the usefulness of the device is shown in the projection (36) extending from the front end (14) of the bracket (12) and adapted to engage the extreme front end of the spring (6). This projection serves to check the vibration of the main spring (6) for it will be readily seen that the pressure of the spiral spring (26) on the spring (6) will cause the latter to slightly pivot on the lug (11) thereby raising the extreme front end of the spring. While the projection (36) is raised at the same time its motion is much less pronounced since it pivots on a shorter arm and its tendency will be to check the upward motion of the extreme front end of the spring (6).

I claim:

1. In a vehicle, in combination, an axle, spacing members rising therefrom, a cantilever vehicle spring yieldingly supported by said spacing members and a direct driving connection between the axle and the vehicle body comprising two longitudinal sections pivotally joined to each other with the joint secured to an intermediate portion of the spring and rigidly to the axle and the body.

2. In a vehicle, in combination, an axle, spacing members rising therefrom, a cantilever vehicle spring supporting the vehicle body with one end, and yielding means for supporting the free end of the cantilever spring comprising a bracket adapted to slidably receive said free end having one arm pivotally supported in the spacing members and another arm yieldingly supported over the spring, an extension of the bracket beyond its pivotal support being adapted to engage the extreme end of the spring for checking its spring action.

3. In a vehicle, in combination, an axle, spacing members rising therefrom, a cantilever vehicle spring supporting the vehicle body with one end, yielding means for supporting the free end of the cantilever spring comprising a bracket adapted to slidably receive said free end having one arm pivotally supported in the spacing members and another arm yieldingly supported over the spring, and a direct driving connection between the axle and the vehicle body.

4. In a vehicle, in combination, an axle, spacing members rising therefrom, a cantilever vehicle spring supporting the vehicle body with one end, yielding means for supporting the free end of the cantilever spring comprising a bracket adapted to slidably receive said free end having one arm pivotally supported in the spacing members and another arm yieldingly supported over the spring, and a direct driving connection between the axle and the vehicle body comprising two longitudinal sections pivotally joined to each other and rigidly to the axle and the body.

5. In a vehicle, in combination, an axle, spacing members rising therefrom, a cantilever vehicle spring supporting the vehicle body with one end, yielding means for supporting the free end of the cantilever spring comprising a bracket adapted to slidably receive said free end having one arm pivotally supported in the spacing members and another arm yieldingly supported over the spring, and a direct driving connection between the axle and the vehicle body comprising two members pivotally joined to each other with the joint secured to an intermediate portion of the spring and rigidly to the axle and the body.

RAYMOND RAGSDALE.